US012103055B2

(12) United States Patent
Wrenn et al.

(10) Patent No.: US 12,103,055 B2
(45) Date of Patent: Oct. 1, 2024

(54) FUEL TANK CLEANING APPARATUS

(71) Applicants: Wes Wrenn, Hampstead, NC (US); Kalie Wrenn, Hampstead, NC (US)

(72) Inventors: Wes Wrenn, Hampstead, NC (US); Kalie Wrenn, Hampstead, NC (US)

( * ) Notice: Subject to any disclaimer, the term of this patent is extended or adjusted under 35 U.S.C. 154(b) by 503 days.

(21) Appl. No.: 17/387,122

(22) Filed: Jul. 28, 2021

(65) Prior Publication Data

US 2022/0371062 A1 Nov. 24, 2022

Related U.S. Application Data

(60) Provisional application No. 63/189,908, filed on May 18, 2021.

(51) Int. Cl.
*B08B 9/08* (2006.01)
*B08B 5/04* (2006.01)

(52) U.S. Cl.
CPC .................. *B08B 9/08* (2013.01); *B08B 5/04* (2013.01); *B08B 2209/08* (2013.01)

(58) Field of Classification Search
CPC ..... B08B 2209/08; B08B 5/04; B08B 9/0808; B08B 9/08; B01D 12/2483
USPC ............... 15/246.5; 141/65; 134/166 R, 172, 134/169 R, 111
See application file for complete search history.

(56) References Cited

U.S. PATENT DOCUMENTS

| | | | | |
|---|---|---|---|---|
| 9,453,583 | B1 * | 9/2016 | Boucher | F16K 24/042 |
| 2007/0000558 | A1 * | 1/2007 | Burris | B65D 90/00 141/65 |
| 2009/0308412 | A1 * | 12/2009 | Dixon | B08B 9/093 134/10 |

* cited by examiner

*Primary Examiner* — Katina N. Henson
(74) *Attorney, Agent, or Firm* — Russell D. Nugent; The Humphries Law Firm, P.C.

(57) ABSTRACT

A fuel tank cleaning apparatus configured to remove sludge and prevent sludge accumulation in a fuel tank. A sludge collecting pipe lays horizontally along most of a length of a floor of the fuel tank. A plurality of openings penetrate the sludge collecting pipe along its length. The plurality of openings gradually increase in diameter along the length of the sludge collecting pipe to allow for uniform suction along the entire floor of the tank. A connecting elbow fluidly connects the sludge collecting pipe to a suction pipe. A pump is attachable to the suction pipe to create a suction at the bottom of the tank. The fuel tank cleaning apparatus may be positioned during the construction of the fuel tank, may be retrofitted into existing fuel tanks, or may be integrated into the floor of the fuel tank itself.

17 Claims, 5 Drawing Sheets

FUEL TANK CLEANING APPARATUS

CROSS-REFERENCE TO RELATED APPLICATION

The present application claims priority to, and the benefit of, U.S. Provisional Application No. 63/189,908, which was filed on May 18, 2021 and is incorporated herein by reference in its entirety.

FIELD OF THE INVENTION

The present invention generally relates to a tank cleaning apparatus, and more specifically to an apparatus for removing sludge or other contaminates from a fuel tank. Accordingly, the present specification makes specific reference thereto. However, it is to be appreciated that aspects of the present invention are also equally amenable to other like applications, devices, and methods of manufacture.

BACKGROUND OF THE INVENTION

A fuel tank is a container configured to hold flammable or combustible fluids safely. Fuel tank sludge is a solid or gel in fuel caused by the fuel solidifying or the buildup and collection of dirt, rust, or any microorganisms in the bottom of the tank. Fuel sludge can be a major contributor to internal combustion engine problems and can require the engine to be repaired or replaced if the damage is severe. Additionally, water can condensate and contaminate the fuel in the tank adding to the problem. Ways to minimize sludge production and accumulation include performing frequent fuel changes, mechanically flushing the tank, or de-sludging chemicals.

Fuel polishing is a technical cleaning process used to remove or filter microbial contamination from oil and hydrocarbon fuel stored in a tank. Fuel polishing involves the removal of water, sediment, and microbial contamination from fuels. This fuel contamination builds up over time in stored fuels if they are not treated regularly.

Multiple stages are required during the polishing process to effectively remove the solid particulates, wet foreign matter, and water from the fuel. This multi-stage process is highly efficient but is complicated and expensive. The amount of time required to complete the fuel polishing process can be significant. A fuel water separator typically features various stages of filtration where the water and large particulates are removed from the fuel with the use of centrifugal force and a filter element. Once the fuel leaves the fuel water separator, most fuel maintenance systems feature a secondary stage of filtration that features a highly-efficient fine filter. These filters can capture particulate in the three microns size range in addition to absorbing any remaining water. Polishing systems are often mounted on a cart or trailer and are brought to the fuel storage tank on a regular basis.

Alternatively, additives or chemical fuel sludge treatments may be used to limit fuel tank sludge. There are several common additives typically used in combination. A water controller is used to control excess water condensation in the tank and limits rust. Surfactants clean delivery lines out of the tank. Stabilizers may include antioxidants to stabilize the fuel from outside environmental factors And, biocides treat microbial growth in the tank.

Annual deep cleaning of fuel tanks is mandatory to remove the buildup of sludge. Sludge removal costs a considerable amount of money depending on the size of tank and severity of the buildup. Costly pump failure and equipment downtime also occur because of the sludge buildup. This creates a scenario where the pump struggles to pump liquids through the fuel line and pumps sludge directly into the equipment causing damage to the equipment.

Accordingly, there is a great need for a more economical and efficient way to maintain fuel tanks. There is also a need for a way to remove sludge or other contaminates from a tank that does not require a professional tank cleaning service. Similarly, there is a need for an sludge removal apparatus that is directly built into a fuel tank. There is also a need for an apparatus that eliminates miniscule amounts of water and debris that occur in a fuel tank over time. Further, there is a need for an apparatus that can extend the life of a fuel tank and protect equipment fed by the fuel tank.

In this manner, the improved commemorative system of the present invention accomplishes all of the forgoing objectives, thereby providing an easy solution for efficiently preventing the buildup of sludge in a fuel tank. A primary feature of the present invention is an apparatus for removing sludge or other contaminates that can be permanently incorporated into a fuel tank. The present invention eliminates the need for fuel tanks to be professionally cleaned or the fuel to be "polished" saving the end user thousands of dollars over the life of the tank. This creates an enormous advantage over other tank manufacturers that only offer a suction tube to hook to portable cleaning equipment. The present invention promotes tank cleanliness by eliminating the miniscule amounts of water and debris that occur during use by allowing the filter to capture contaminants with each use, rather than allowing them to build up over time. Finally, the improved fuel tank cleaning apparatus of the present invention is capable of extending the life of a fuel tank by instantly removing water that causes rust and the deterioration of the interior tank walls.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a fuel tank cleaning apparatus. The fuel tank cleaning apparatus is configured to remove sludge and prevent accumulation of sludge in a fuel tank. The fuel tank cleaning apparatus comprises a sludge collecting pipe. The sludge collecting pipe is configured to extend horizontally along a floor of the fuel tank approximately 90% of the length of the fuel tank. The sludge collecting pipe may be approximately one to one and a half inches in diameter.

The sludge collecting pipe comprises a distal end and a proximal end connected along a sidewall extending a length of the sludge collecting pipe. The distal end is capped and the proximal end is open. The proximal end may be straight or curve perpendicularly upward. The proximal end is configured to engage a suction pipe.

The sidewall comprises a plurality of openings penetrating the sidewall along its length. The plurality of openings extend laterally at approximately six inch intervals. The plurality of openings gradually increase in diameter from the proximal end to the distal end. The plurality of openings generally range from approximately $\frac{1}{5}^{th}$ of an inch in diameter to approximately $\frac{1}{3}^{rd}$ of an inch in diameter. A proximal most opening is generally approximately 1/5th of an inch in diameter and a distal most opening is generally approximately 1/3rd of an inch in diameter. The plurality of openings can penetrate either one or both sides of the sidewall at any height.

The fuel tank cleaning apparatus may further comprise a suction pipe and a connecting elbow. The connecting elbow fluidly connects the suction pipe to the proximal end of the sludge collecting pipe. Once connected, the suction pipe extends perpendicularly upward from the sludge collecting pipe. The connecting elbow may be integrated into the proximal end of the sludge collecting pipe. Alternatively, the connecting elbow may be attached to the sludge connecting pipe via a fitting.

The fuel tank cleaning apparatus may further comprise a plurality of pipe straps. The plurality of pipe straps are configured to engage the sludge collecting pipe and secure it to a floor of the fuel tank. The fuel tank cleaning apparatus may further comprise a pump. The pump is fluidly connectable to the suction pipe. The pump is configured to create a suction in the suction pipe drawing sludge through the plurality of openings and up the suction pipe.

The subject matter disclosed and claimed herein, in one embodiment thereof, comprises a fuel tank cleaning apparatus. The fuel tank cleaning apparatus comprises a fuel tank comprising a floor. The fuel tank cleaning apparatus further comprises a sludge collecting pipe. The sludge collecting pipe is horizontally integrated into the floor of the fuel tank approximately 90% of the length of the fuel tank. The sludge collecting pipe is approximately one to one and a half inches in diameter.

The sludge collecting pipe comprises a distal end and a proximal end connected along a sidewall extending a length of the sludge collecting pipe. The distal end is capped and the proximal end is open. The proximal end may be straight or curve perpendicularly upward. The proximal end is configured to engage a suction pipe.

The sidewall comprises a plurality of openings penetrating the sidewall along its length. The plurality of openings extend laterally at approximately six inch intervals. The plurality of openings gradually increase in diameter from the proximal end to the distal end. The plurality of openings generally range from approximately 1/5th of an inch in diameter to approximately 1/3rd of an inch in diameter. A proximal most opening is generally approximately 1/5th of an inch in diameter and a distal most opening is generally approximately 1/3rd of an inch in diameter. The plurality of openings can penetrate either one or both sides of the sidewall at any height.

The fuel tank cleaning apparatus may further comprise a suction pipe and a connecting elbow. The connecting elbow fluidly connects the suction pipe to the proximal end of the sludge collecting pipe. Once connected, the suction pipe extends perpendicularly upward from the sludge collecting pipe. The connecting elbow may be integrated into the proximal end of the sludge collecting pipe. Alternatively, the connecting elbow may be attached to the sludge connecting pipe via a fitting.

The fuel tank cleaning apparatus may further comprise a pump. The pump is fluidly connectable to the suction pipe. The pump is attachable to a top of an exterior of the fuel tank. The pump is configured to create a suction in the suction pipe drawing sludge through the plurality of openings and up the suction pipe.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
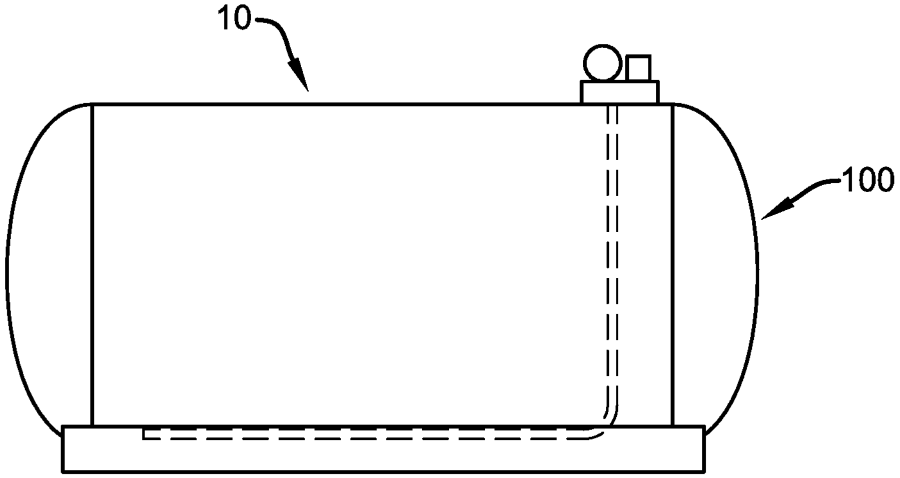
FIG. 1 illustrates a side perspective view of a fuel tank cleaning apparatus of the present invention for use with a fuel tank in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a fuel tank cleaning apparatus comprised of a one to one and a half inch pipe, capped off on the end with approximately ⅕$^{th}$. ⅓$^{rd}$ inch in diameter holes cut through the side of the pipe approximately every six inches. The fuel tank cleaning apparatus extends approximately 90% of the length of the tank and lays horizontally on the base of the tank. A sludge pipe connects to a suction tube with a 90-degree elbow, allowing a pump to create suction off the entire base of the tank where sludge accumulation occurs. The holes will increase in size the further they are from the suction tube to ensure equal suction throughout.

Figure 8:
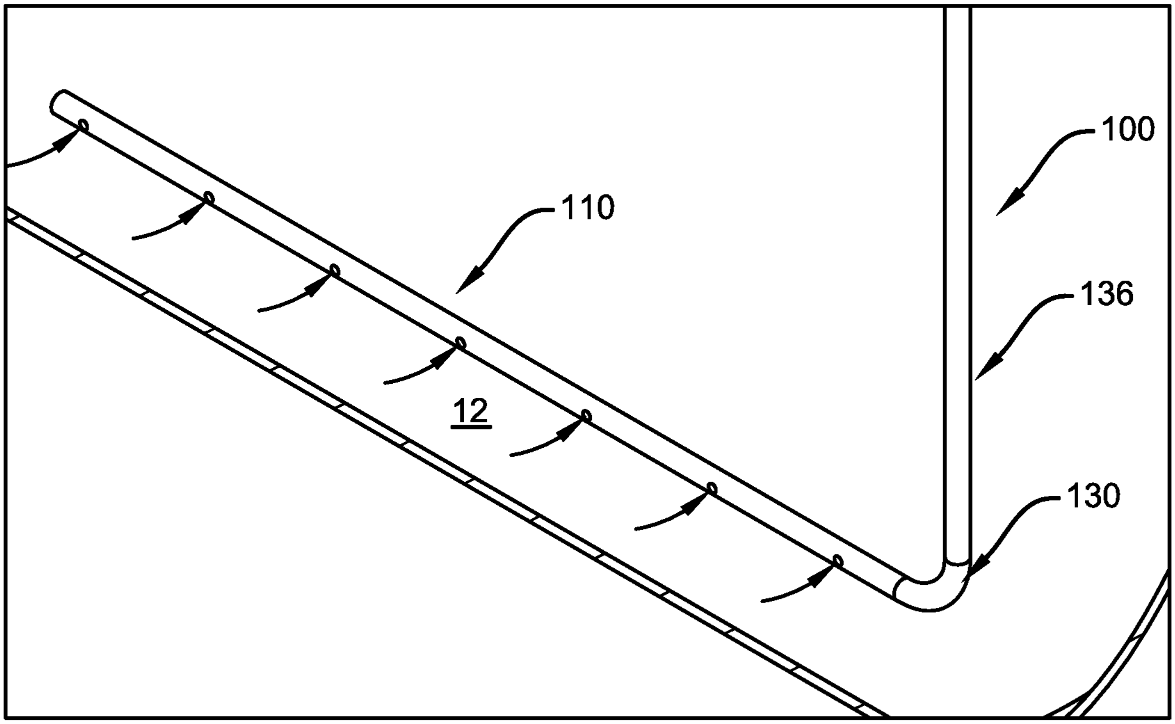
FIG. 8 illustrates a perspective view of a flow of sludge entering a plurality of openings in the sludge collecting pipe of the fuel tank cleaning apparatus of the present invention for use with the fuel tank in accordance with the disclosed architecture.
Figure 9:
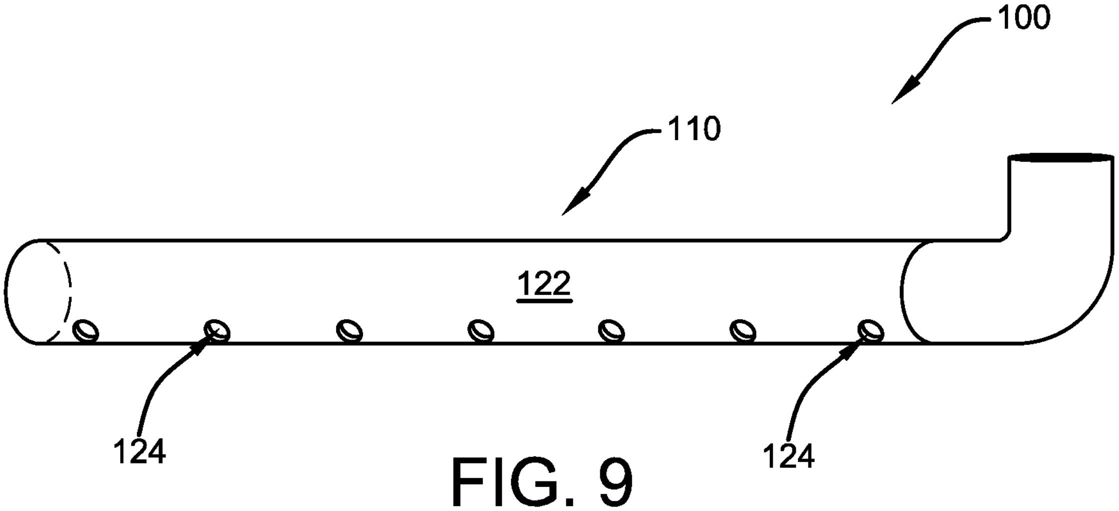
FIG. 9 illustrates a closeup view of the plurality of openings in the sludge collecting pipe of the fuel tank cleaning apparatus of the present invention for use with the fuel tank in accordance with the disclosed architecture.
Figure 10:
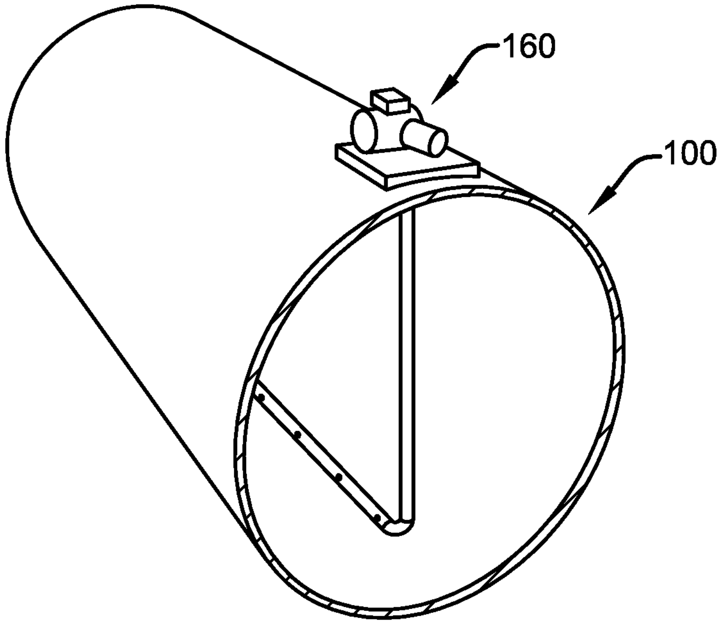
FIG. 10 illustrates a perspective view of the fuel tank cleaning apparatus of the present invention for use with a fuel tank in accordance with the disclosed architecture.

Referring initially to the drawings, FIGS. 1-10 illustrate a fuel tank cleaning apparatus 100. As illustrated in FIG. 1, the fuel tank cleaning apparatus 100 is configured to remove sludge and prevent the accumulation of sludge and other contaminates in a fuel tank 10. The fuel tank cleaning apparatus 100 may be positioned during the construction of the fuel tank 10 as illustrated in FIG. 10 or may be retrofitted into existing fuel tanks.

Figure 2:
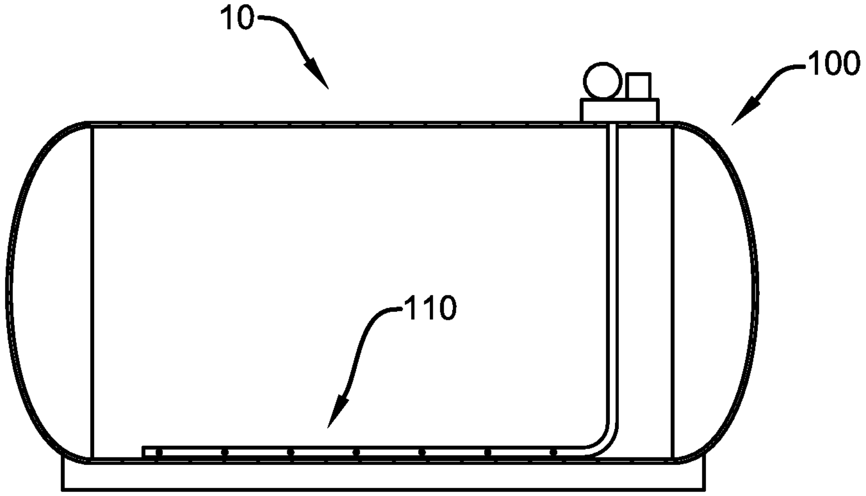
FIG. 2 illustrates a cutaway view of the fuel tank cleaning apparatus of the present invention for use with the fuel tank in accordance with the disclosed architecture.

The fuel tank cleaning apparatus 100 comprises a sludge collecting pipe 110. The sludge collecting pipe 110 is typically configured to extend substantially horizontally along a floor 12 of the fuel tank 10 as illustrated in FIG. 2. The sludge collecting pipe 110 is typically sized to extend approximately 90% of the length of the fuel tank 10, but may be longer or shorter as desired. The sludge collecting pipe 110 is a metal or plastic pipe approximately one to one and a half inches in diameter but may be smaller or larger to fit a particular fuel tank. The preferred diameter will depend on the size of the pump which will typically range from between 8-60 gallons per minute.

Figure 3:
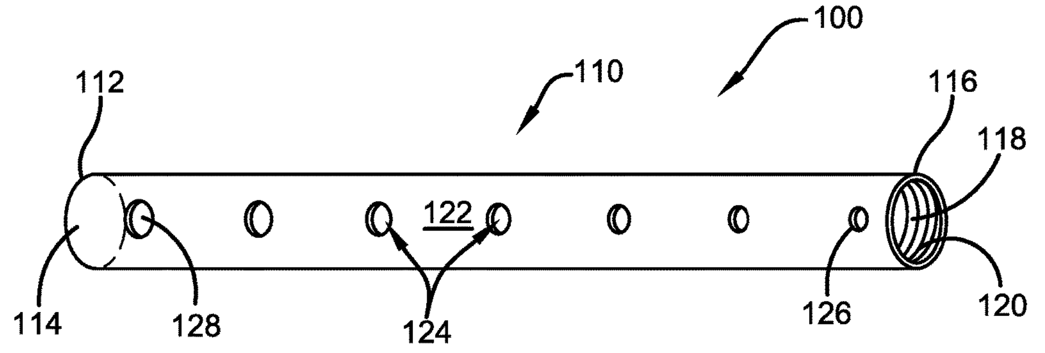
FIG. 3 illustrates a side perspective view of a sludge collecting pipe of the fuel tank cleaning apparatus of the present invention for use with the fuel tank in accordance with the disclosed architecture.

As illustrated in FIG. 3, the sludge collecting pipe 110 comprises a distal end 112 and a proximal end 116. The distal 112 and proximal 116 ends are connected along a sidewall 122. The sidewall 122 extends a length of the sludge collecting pipe 110. The distal end 112 is capped via an end cap 114 and the proximal end 116 comprises an opening 118 that is not capped. The proximal end 116 may be straight or curve perpendicularly upward. The proximal end 116 is configured to engage a suction pipe. The proximal end 116 may further comprise a fitting 120, such as a screw thread or quick connect, to engage the suction pipe.

As illustrated in FIGS. 3-8, the sidewall 122 comprises a plurality of openings 124. The plurality of openings 124 penetrate the sidewall 122 along its length. The plurality of openings 124 in one embodiment typically extend laterally at approximately six inch intervals but may be further or closer apart as desired. This interval is desirable for tanks that range from six to twelve feet in length. In another example with a longer tank, the plurality of openings 124 may be up to 24 inch intervals. The plurality of openings 124 gradually increase in diameter from the proximal end 116 to the distal end 112 of the sludge collecting pipe 110. The plurality of openings 124 generally range from approximately ⅕$^{th}$ of an inch in diameter to approximately ⅓$^{rd}$ of an inch in diameter but may be smaller or larger in diameter as desired. In one embodiment, a proximal most opening 126 of the plurality of openings 124 is generally approximately ⅕$^{th}$ of an inch in diameter. A distal most opening 128 of the plurality of openings 124 is generally approximately ⅓$^{rd}$ of an inch in diameter. This configuration is advantageous as locating the larger openings 124 further from the suction tube and smaller openings 124 closer to the suction tube 136 ensures even and consistent suction across the entire bottom surface of the tank 10. In other embodiments, the plurality of openings 124 may have gradually larger diameters to accommodate larger pumps that pull with greater suction.

The plurality of openings 124 are typically round in shape but may be shaped in any geometric configuration. The plurality of openings 124 can penetrate either one or both sides of the sidewall 122 at any height. The plurality of openings 124 may be penetrate the sidewall 122 adjacent to the floor 12 of the fuel tank 10 as illustrated in FIG. 9 or may be positioned along the sides or the top of the sidewall 122 as desired.

Figure 4:
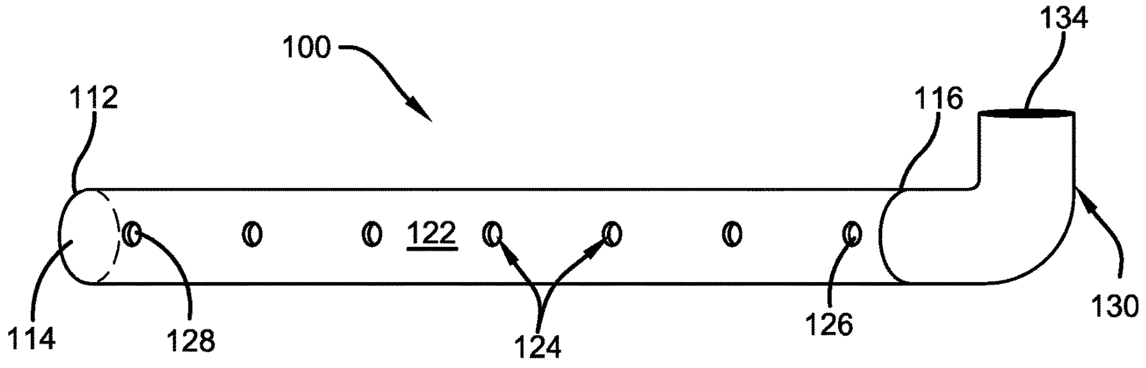
FIG. 4 illustrates a side perspective view of the sludge collecting pipe and a connecting elbow of the fuel tank cleaning apparatus of the present invention for use with the fuel tank in accordance with the disclosed architecture.
Figure 5:
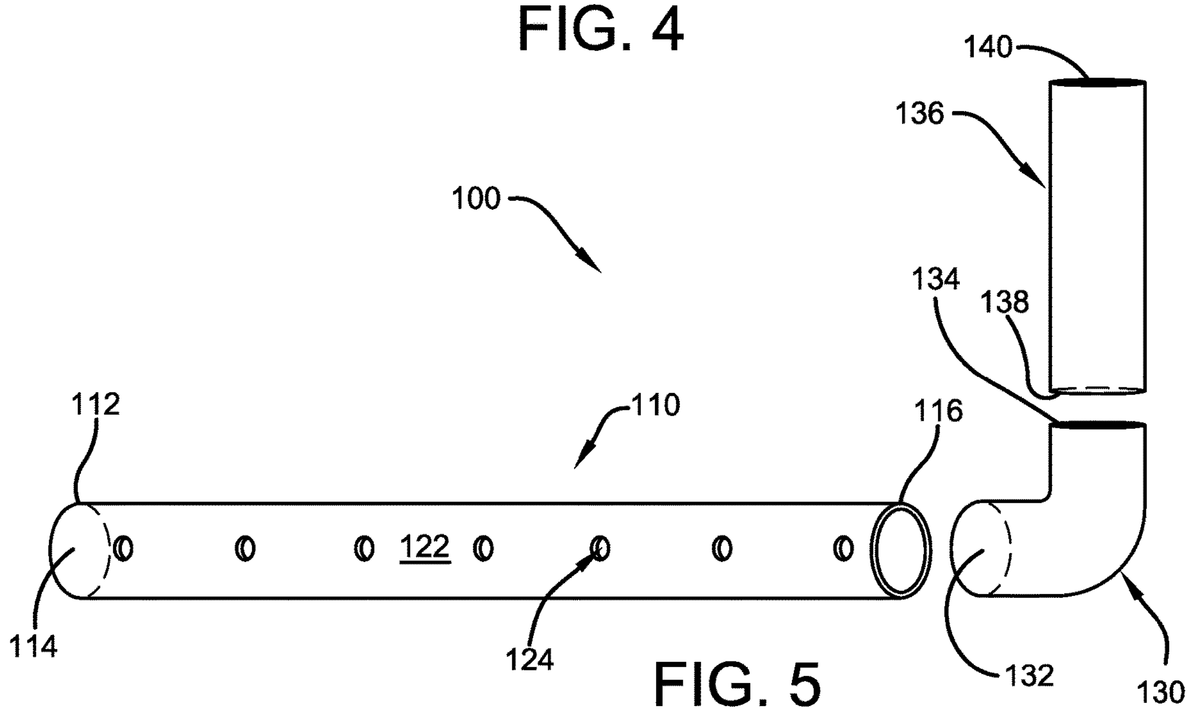
FIG. 5 illustrates an exploded view of the sludge collecting pipe, the connecting elbow, and a suction pipe of the fuel tank cleaning apparatus of the present invention for use with the fuel tank in accordance with the disclosed architecture.

As illustrated in FIGS. 4 and 5, the fuel tank cleaning apparatus 100 may further comprise a suction pipe 136 and a connecting elbow 130. The connecting elbow 130 fluidly connects the suction pipe 136 to the proximal end 116 of the sludge collecting pipe 110. Once connected, the suction pipe 136 extends generally perpendicularly upward from the sludge collecting pipe 110. The connecting elbow 130 may be integrated into the proximal end 116 of the sludge collecting pipe 110 as illustrated in FIG. 4. Alternatively, as illustrated in FIGS. 5 and 6, the connecting elbow 130 may be attached to the sludge connecting pipe 110 via a fitting 120, such as a swivel, 90 degree elbow, screw thread, a quick connect, a weld, a mechanical connector, or the like.

A sludge connecting pipe end 132 of the connecting elbow 130 engages the opening 118 in the proximal end 116 of the sludge connecting pipe 110. A suction pipe end 134 of the connecting elbow 130 is configured to engage an inlet end 138 of the suction pipe 136. Alternatively, the sludge connecting pipe 110, the connecting elbow 130, and the suction pipe 136 may be integrated as a single unit without connections as illustrated in FIG. 2.

Figure 6:
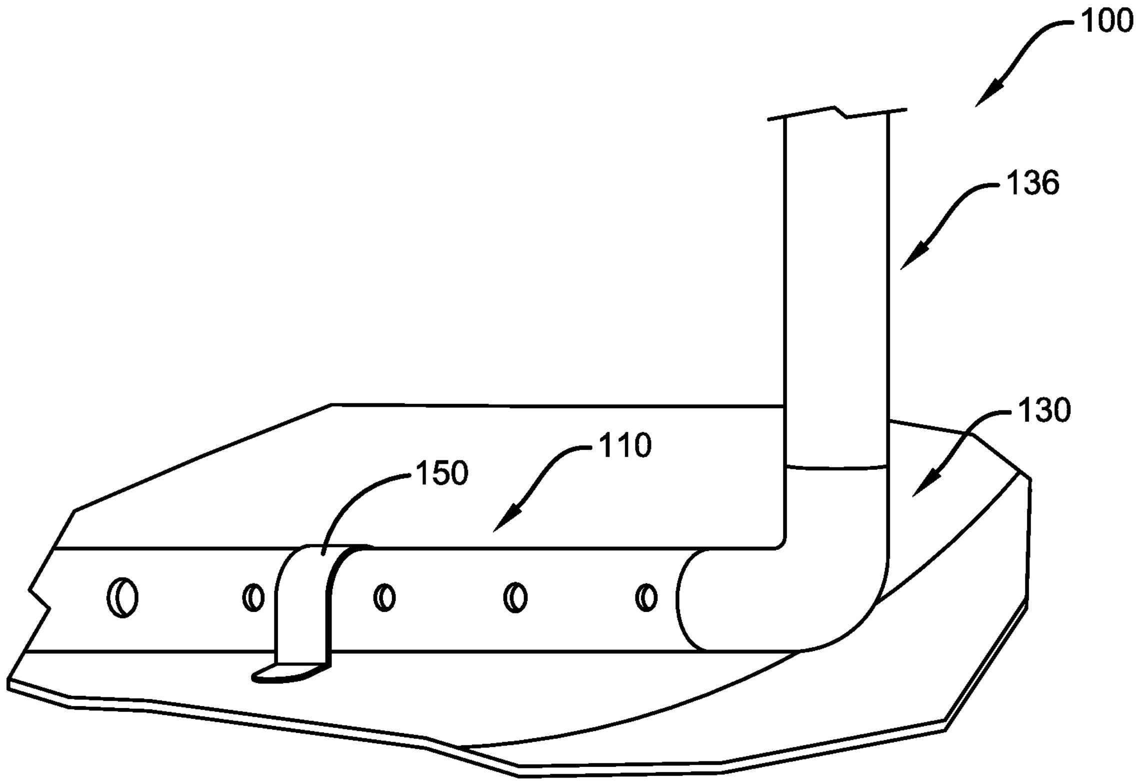
FIG. 6 illustrates a closeup view of the sludge collecting pipe, the connecting elbow, and the suction pipe of the fuel tank cleaning apparatus of the present invention for use with the fuel tank in accordance with the disclosed architecture.
Figure 7:
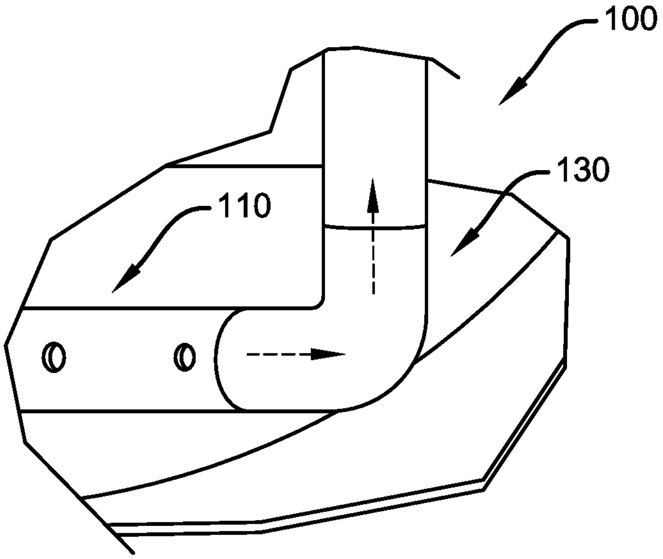
FIG. 7 illustrates a closeup view of sludge entering the sludge collecting pipe and the connecting elbow of the fuel tank cleaning apparatus of the present invention for use with the fuel tank in accordance with the disclosed architecture.

As illustrated in FIG. 6, the fuel tank cleaning apparatus 100 may further comprise a plurality of pipe straps 150. The plurality of pipe straps 150 are typically metal or plastic brackets or clamps configured to engage the sludge collecting pipe 110 and secure it to the floor 10 of the fuel tank 12. As illustrated in FIG. 10, the fuel tank cleaning apparatus 100 may further comprise a pump 160. The pump 160 is fluidly connectable to the suction pipe 136 at an outlet end 140 of the suction pipe 136. The pump 160 is configured to create a suction in the suction pipe 136 drawing sludge, debris, or other contaminates through the plurality of openings 124 of the sludge collecting pipe 110, through the connecting elbow 130, and up the suction pipe 136 as illustrated in FIGS. 7 and 8. The pump 160 may be externally located to the tank or may be a submersible pump.

Figure 11:
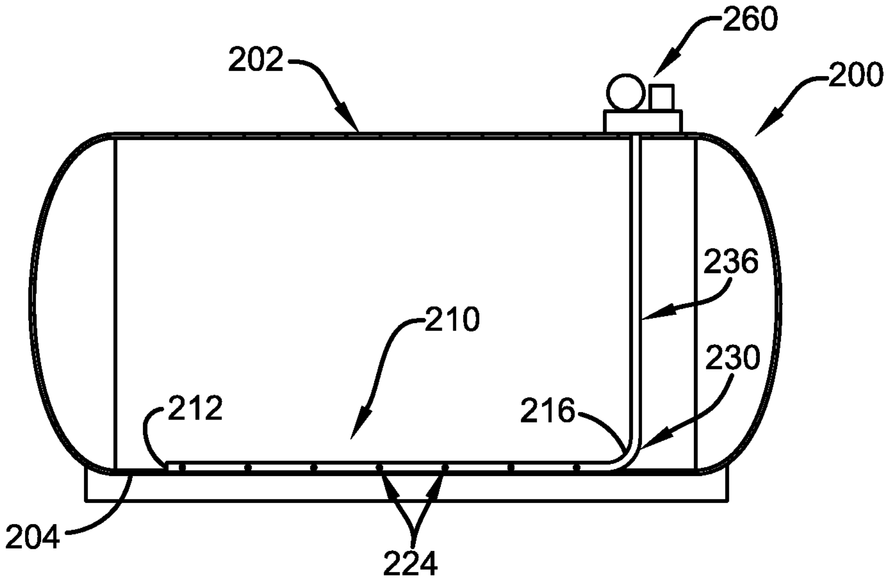
FIG. 11 illustrates a perspective view of a fuel tank cleaning apparatus of the present invention in accordance with the disclosed architecture.

The subject matter disclosed and claimed herein, in one embodiment thereof, comprises a fuel tank cleaning apparatus 200. As illustrated in FIG. 11, the fuel tank cleaning apparatus 200 comprises a fuel tank 202 comprising a floor 204. The fuel tank cleaning apparatus 200 further comprises a sludge collecting pipe 210. The sludge collecting pipe 210 is horizontally integrated into the floor 204 of the fuel tank 202 extending approximately 90% of the length of the fuel tank 202. The sludge collecting pipe 210 is approximately one to one and a half inches in diameter but may be smaller or larger depending on the size of the fuel tank 202.

The sludge collecting pipe 210 comprises a distal end 212 and a proximal end 216. The distal 212 and proximal 216 ends are connected along a sidewall 222. The sidewall 222 extends a length of the sludge collecting pipe 210. The distal end 212 is capped and the proximal end 216 is open. The proximal end 216 may be straight or curve perpendicularly upward. The proximal end 216 is configured to engage a suction pipe 236. The proximal end 216 may comprise a fitting 220, such as a screw thread or quick connect, to engage the suction pipe 236.

The sidewall 222 comprises a plurality of openings 224 penetrating the sidewall 222 along its length. The plurality of openings 224 typically extend laterally at approximately six inch intervals but may be further or closer apart as desired. The plurality of openings 224 gradually increase in diameter from the proximal end 216 to the distal end 212 of the sludge collecting pipe 210. The plurality of openings 224 generally range from approximately ⅕$^{th}$ of an inch in diameter at the proximal end 216 to approximately ⅓$^{rd}$ of an inch in diameter at the distal end 212 but may be smaller or larger in diameter as desired.

The plurality of openings 224 are typically round in shape but may be shaped in any geometric configuration. The plurality of openings 224 can penetrate either one or both sides of the sidewall 222 at any height. The plurality of openings 224 may be penetrate the sidewall 222 adjacent to the floor 204 of the fuel tank 202 or may be positioned along the sides or the top of the sidewall 222 as desired.

The fuel tank cleaning apparatus 200 further comprise a suction pipe 236 and a connecting elbow 230. The connecting elbow 230 fluidly connects the suction pipe 236 to the proximal end 216 of the sludge collecting pipe 210. Once connected, the suction pipe 236 extends perpendicularly upward from the sludge collecting pipe 210. The connecting elbow 230 may be integrated into the proximal end 216 of the sludge collecting pipe 210. Alternatively, the connecting elbow 230 may be attached to the sludge connecting pipe 210. Alternatively, the sludge connecting pipe 210, the connecting elbow 230, and the suction pipe 236 may be integrated as a single unit without connections.

The fuel tank cleaning apparatus 200 may further comprise a pump 260. The pump 260 is fluidly connectable to the suction pipe 236. The pump 260 is attachable to a top of an exterior of the fuel tank 202. The pump 260 is configured to create a suction in the suction pipe 236 drawing sludge, debris, or other contaminates through the plurality of openings 224 of the sludge collecting pipe 210, through the connecting elbow 230, and up the suction pipe 236.

Notwithstanding the forgoing, the fuel tank cleaning apparatus 100 and 200 can be any suitable size, shape, and configuration as is known in the art without affecting the overall concept of the invention, provided that it accomplishes the above stated objectives. One of ordinary skill in the art will appreciate that the shape and size of the fuel tank cleaning apparatus 100 and 200 and its various components, as show in the FIGS. are for illustrative purposes only, and that many other shapes and sizes of the fuel tank cleaning apparatus 100 and 200 are well within the scope of the present disclosure. Although dimensions of the fuel tank cleaning apparatus 100 and 200 and its components (i.e., length, width, and height) are important design parameters for good performance, the fuel tank cleaning apparatus 100 and 200 and its various components may be any shape or size that ensures optimal performance during use and/or that suits user need and/or preference. As such, the fuel tank cleaning apparatus 100 and 200 may be comprised of sizing/shaping that is appropriate and specific in regard to whatever the fuel tank cleaning apparatus 100 and 200 is designed to be applied.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fuel tank cleaning apparatus for use with fuel and a fuel tank comprising: a sludge collecting pipe comprising a distal end and a proximal end connected by a sidewall comprising a plurality of openings from the proximal end to the distal end; wherein the distal end is capped and the proximal end is open; wherein the proximal end is configures to engage a suction pump; wherein the sludge collecting pipe extends horizontally along a floor of the fuel tank and lies within the fuel on the floor of the fuel tank, wherein the fuel tank cleaning apparatus is positioned during construction of the fuel tank or retro fitted into the fuel tank to remove and prevent an accumulation of fuel tank sludge, water and other contaminants in the fuel and the fuel tank.

2. The fuel tank cleaning apparatus of claim 1, wherein the proximal end curves upward perpendicularly.

3. The fuel tank cleaning apparatus of claim 1, wherein the sludge collecting pipe is one to one and a half inches in diameter.

4. The fuel tank cleaning apparatus of claim 1, wherein the plurality of openings range from ⅕th to ⅓rd inches in diameter.

5. The fuel tank cleaning apparatus of claim 1, wherein a proximal most opening of the plurality of openings is ⅕th of an inch in diameter and a distal most opening of the plurality of openings is ⅓rd of an inch in diameter.

6. The fuel tank cleaning apparatus of claim 1, wherein the plurality of openings penetrate the sidewall on both sides.

7. The fuel tank cleaning apparatus of claim 1, wherein the plurality of openings penetrate the sidewall adjacent to a floor of the fuel tank.

8. The fuel tank cleaning apparatus of claim 1, wherein the plurality of openings penetrate the sidewall at six-inch intervals.

9. A method of maintaining, preserving and maximizing fuel and a fuel tank comprising the fuel tank cleaning apparatus of claim 1; a suction pipe; a connecting elbow fluidly connecting the suction pipe to the proximal end of the sludge collecting pipe perpendicularly; attaching a pump engaged to an open end of the suction pipe and pumping fuel out of the tank through the sludge collecting pipe, from the lowest point of the tank.

10. The fuel tank cleaning apparatus of claim 1 wherein the plurality of openings gradually increase in diameter from the proximal end to the distal end of the sludge collecting pipe.

11. The method of claim 9, wherein the sludge-collecting pipe is one to one and a half inches in diameter.

12. The method of claim 9, wherein the plurality of openings range from ⅕th to ⅓rd inches in diameter.

13. The method of claim 9, wherein a proximal most opening of the plurality of openings is ⅕th of an inch in diameter and a distal most opening of the plurality of openings is ⅓rd of an inch in diameter.

14. The method of claim 9, wherein the connecting elbow is integrated into the proximal end of the sludge collecting pipe.

15. The method of claim 9, wherein the connecting elbow connects to the proximal end of the sludge collecting pipe via a fitting.

16. The method of claim 9, wherein the plurality of openings penetrate the sidewall at six-inch intervals.

17. The method of claim 9 wherein the plurality of openings gradually increase in diameter from the proximal end to the distal end of the sludge collecting pipe.

* * * * *